Nov. 18, 1941.  C. DOERING  2,263,072
CHILLING DEVICE FOR PROCESSING EDIBLE SUBSTANCES
Filed Sept. 12, 1936   2 Sheets-Sheet 2

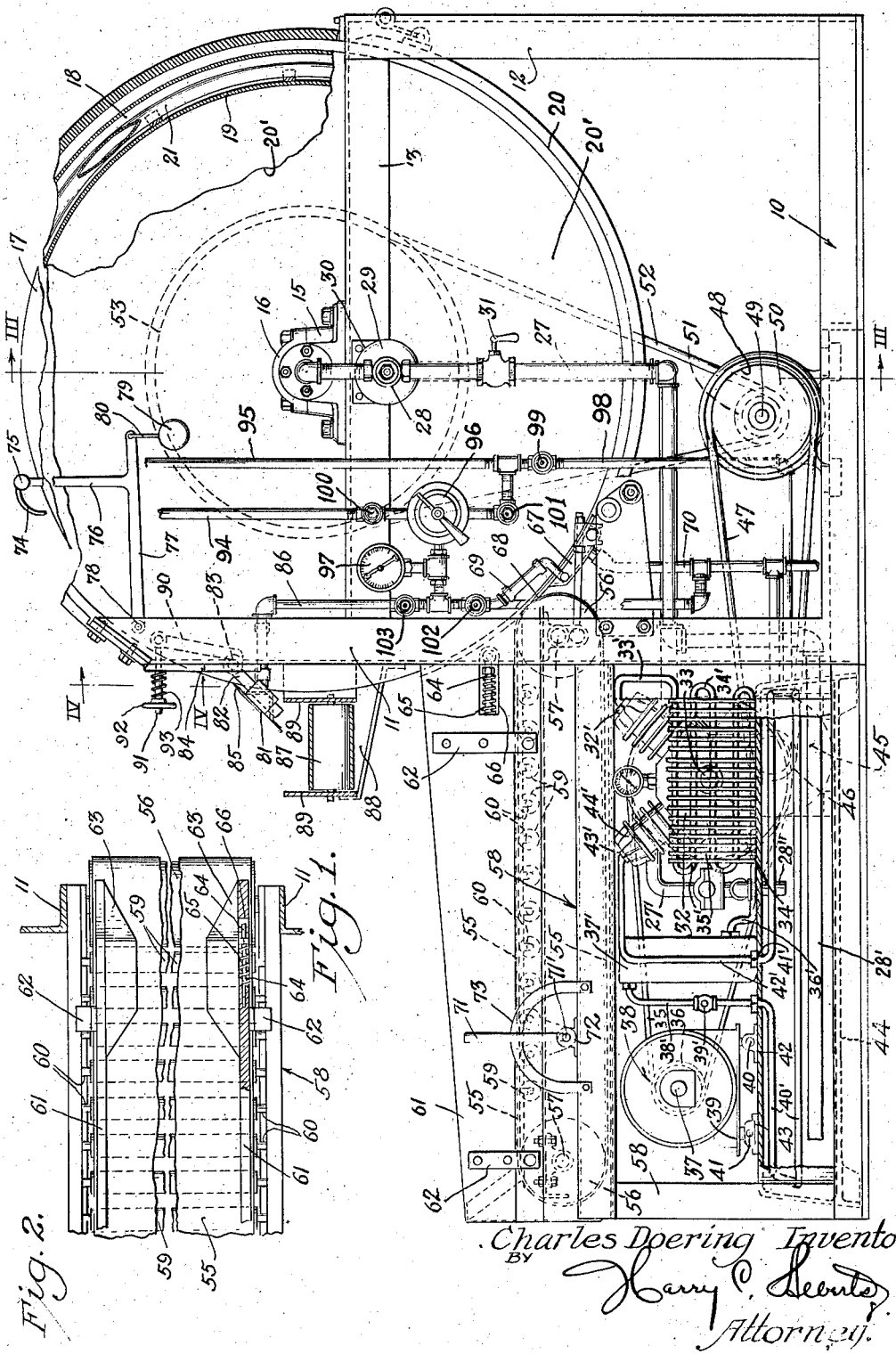

Inventor
Charles Doering
BY
Harry C. Leenty
Attorney

Patented Nov. 18, 1941

2,263,072

UNITED STATES PATENT OFFICE 2,263,072

CHILLING DEVICE FOR PROCESSING EDIBLE SUBSTANCES

Charles Doering, Chicago, Ill., assignor of one-half to Henry Doering, Chicago, Ill.

Application September 12, 1936, Serial No. 100,506

2 Claims. (Cl. 62—114)

This invention relates to chilling devices and more particularly to dairy product chilling machines, although it may be employed with equal advantage for other purposes.

It contemplates more especially the provision of improved means for solidifying or hardening normally liquid or plastic substances directly from the churn or other producing devices.

It has heretofore been the practice of subjecting edible substances such as butter, lard, margarine, and the like to refrigeration prior to packaging or otherwise preparing such for eventual consumption. This involves the placement of freshly produced edible substances into a hardening room which requires considerable time for solidifying the substances and maintaining such against deterioration. Not only is a great deal of time entailed in hardening such substances for preservation and sale, but these become unevenly solidified in that each body proximate to the surface becomes much colder than the interior to the extent that normally plastic edible products such as butter, lard, margarine, and the like become mottled, non-uniform in texture, and lack homogeneity to the extent that the interior is not always maintained fresh nor free from deterioration.

One object of the present invention is to provide means for hardening plastic edible substances substantially uniformly throughout the body thereof.

Another object is to provide means for hardening successive increments of plastic products so as to effect their solidification uniformly and homogeneously.

Still another object is to provide improved means for transferring substances to a refrigerated surface for substantial hardening and chilling.

A further object is to provide improved instrumentalities for transferring edible substances to and from a refrigerated surface to effect the chilling and hardening thereof for preservation.

A still further object is the provision of an improved transfer pan for a chilling machine to effect the delivery and discharge of normally liquid or plastic edible substances for refrigeration and conversion to a solid state.

Still a further object is to provide means for uniformly treating successive increments of plastic substances without entailing undue time or labor and effecting their accumulation into a uniformly blended and homogeneously solidified mass.

An additional object is to provide an improved, compact and self-contained refrigerating unit in combination with a substance chilling machine.

Still an additional object is to provide an improved refrigerated drum for devices of the character mentioned.

Additionally, a specific object is to provide a chilling drum with self-contained coils for receiving a refrigerant directly from a refrigeration unit to effectively maintain the drum at a freezing temperature.

Other objects and advantages will appear from the following description of an illustrative embodiment of the present invention.

In the drawings:

Figure 1 is a fragmentary side view in elevation of a device embodying features of the present invention, parts thereof being shown in section to clarify the showing.

Figure 2 is a fragmentary plan view of a conveyor device utilized to feed edible substances to the refrigerator roll shown in Figure 1.

Figure 3:
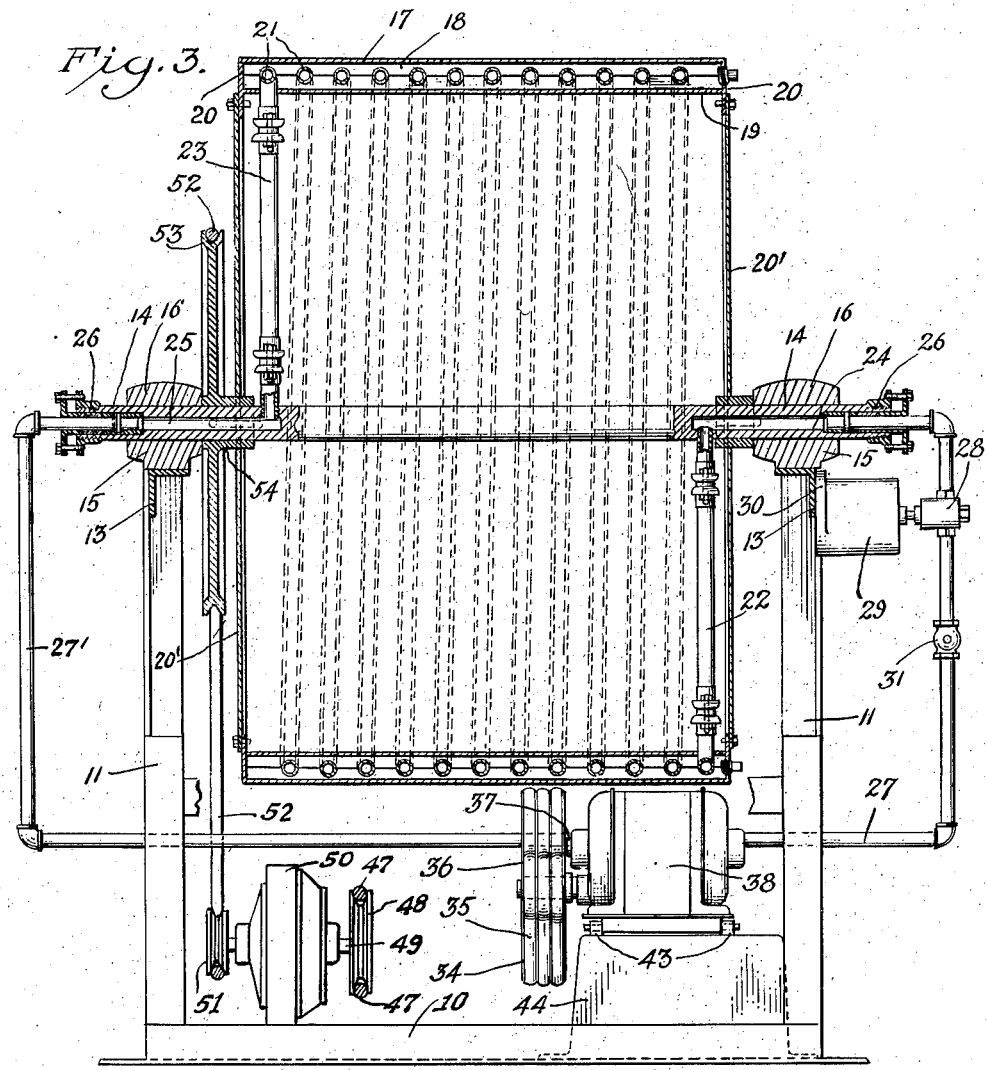
Figure 3 is a sectional view in elevation taken substantially along line III—III of Figure 1.

The structure selected for illustration comprises a frame base 10 from which extend vertical beams 11 and 12 that are in spaced parallelism for rigidly supporting horizontal beams 13 that serve as a part of the frame structure to constitute an instrumentality support as will appear more fully hereinafter. A shaft 14 is supported by the horizontal beam members 13 which are provided with split bearings 15—16 for journalled support of the shaft 14. The shaft 14 carries a comparatively large cylindrical member such as a closed-end drum 17 that is fixed to the shaft 14 for rotation therewith between the horizontal beam members 13.

The drum 17 presents a large circumferential surface that is refrigerated in any suitable manner as commercial practice may dictate. In this instance, the drum 17 is refrigerated by providing a comparatively narrow circumferential chamber 18 interiorly thereof owing to the provision of a somewhat smaller open-end drum 19 concentrically positioned therein for rotation therewith, it being attached to the closed ends 20 of the external drum 17. It is to be noted that the refrigerated chamber or space 18 extends around the interior peripheral surface of the external drum 17 to subject such to refrigeration throughout the surface extent thereof. Circular drum enclosing sides 20' attached to the ends 20 of the external drum 17 are preferably though not essentially provided with sheets of insulation material to discourage conduction therethrough so that the cold from the refrigerant passing through the chamber 18 will be more effectively conducted to the peripheral surface of the drum 17 along the exterior of which the plastic substances adhere for solidification in successive increments as the drum 17 rotates, with the conveyor mechanism feeding the edible substances thereto in a continuity of operations.

To this end, a refrigerant may be supplied to a cooling coil 21 convolutely arranged in and for the entire width of the chamber 18 for communication with an inlet conduit 22 and a discharge conduit 23 connected to the shaft 14 that is partially tubular to present axial passages 24 and 25 proximate to both ends of the shaft 14 for communication with the conduits 22 and 23. It will be apparent, therefore, that any suitable cooling medium may be introduced through the cooling coil 21 to refrigerate the space 18 with the conduits 22 and 23 as intermediate connectors. For that matter, the direction of cooling medium flow or the circulation thereof may be reversed, it only being important to bring the cooling medium in heat exchange relation with the peripheral surface of the external drum 17 for conduction of the cold therethrough to maintain such at a freezing temperature for chilling adhering plastic substances in a manner that will appear more fully hereinafter. The cooling coil 21 as well as the pipes leading thereto may be produced from stainless steel should commercial practice so dictate, and to preclude corrosion of the interior surface of the pipes through which any suitable cooling medium flows, a composition of tin, lead and cadmium is applied thereto by the hot process in a manner common to the art of tinning surfaces.

In the present embodiment, the shaft 14 preferably is provided with couplers 26 fixed to the extremities thereof to enable the connection of the cooling medium supply and return conduits 27—27' thereto as well as the recirculation of the cooling medium in a manner that is well known in the art. The cooling medium supply pipes 27—27' serve, in this instance, as conductors to and from the coil 21 of a brine solution that is, in this instance, forced through the drum cooling coil 21 by means of a circulating pump 28 mounted in the line of the conductors 27—27', the drum 17 and the coil 21 being rotated by an electric motor 45. A manually operated valve 31 is provided in the pipe line 27 below the circulating pump 28 to enable the system to be drained and/or shut off.

In the present embodiment, the brine solution is cooled in the tank defined by the chambered base 44 which has brine outgoing and incoming pipes 28'—28'' extending therein for communication with the pipes 27—27', respectively. The tank cooled brine drawn out through pipe 28' passes through the pipe 27 and is returned through pipe 27' after flowing through the drum refrigerating coil 21 in compartment 18 of the drum 17. These pipes 27—27', 28'—28'', and the coil 21 constitute a complete brine pipe system. In order to effectively cool the brine in the tank 44 which communicates with the pipes 28'—28'', the compressor 32 has its compression cylinder exhaust port 32' communicating with a refrigerant tube 33' that communicates with or constitutes a part of a condenser coil 34'. In order to effectively cool the refrigerant such as sulphur dioxide or methyl chloride in the condenser coil 34', a plurality of fins 35' are transversely disposed and uniformly spaced on the superposed condenser coils 34', and any suitable form of auxiliary cooling means such as a fan (not shown) driven by the compressor shaft 33 may be utilized to aid in reducing the temperature of the refrigerant confined in and passing through the condenser coil 34'.

As shown, the condenser coil 34' terminates in a tube 36' that connects with a refrigerant reservoir or tank 37' mounted on the top of the base 44. The compressed refrigerant is discharged from the reservoir 37' through the tube 38' provided with an expansion valve 39' that communicates with an expansion coil 40' confined in the brine that substantially fills the tank 44 to refrigerate the brine before being discharged therefrom through the pipe 28'. As shown, the discharge end of the expansion coil 40' emerges as at 41' from the tank 44 for connection through a tube 42' to the intake port 43' of the compressor cylinder 44'. It will be observed that the refrigerant expansion coil 40' may be arranged in any suitable manner for immersion in the brine confined in the tank 44 to impart the most effective heat exchange therebetween. This may take a variety of forms depending upon the dictates of commercial practice.

As shown in Figures 1 and 3, the compressor 32 has a main shaft 33 carrying a multiple pulley 34 having a plurality of belts 35 in frictional engagement with the periphery thereof to extend over and engage the periphery of a pulley 36 carried by the armature shaft 37 of an electric motor 38. The electric motor 38 has its base 39 provided with a pair of stub shafts 40 and 41 depending therefrom for journaled support in brackets 42 and 43 so that the motor 38 with its mounting shafts 40—41 can be shifted in brackets 42—43 to maintain the desired tension in the belts 35. In this manner, the motor 38 is horizontally adjustable to maintain the proper tension in the multiple belts 35. The brackets 42 and 43 are fixed to a pier 44 carried by the base 10 which also serves as a mount for the compressor 32 described supra.

Another electric motor 45 is mounted on the base 10 and has a pulley 46 on the armature shaft thereof to drive a belt 47 having frictional peripheral engagement with a pulley 48 carried by a shaft 49 of a speed reducer 50. The speed reducer 50 is also mounted on the base 10 and has a comparatively smaller pulley 51 driven by the shaft of the speed reducer 50 to drive a belt 52. The endless belt 52 engages the periphery of a comparatively larger pulley 53 having its axial hub 54 fixed to the shaft 14 to impart comparatively slow counterclockwise rotation (Figure 1) to the drum 17.

The substances to be refrigerated are supplied to the peripheral surface of the external drum 17 by an endless conveyor belt 55 which traverses over end pulleys 56 fixed to shafts 57. The shafts 57 are journalled in a conveyor frame unit 58 which is supported by the standards 11 and forward standards 58. Intermediate rollers 59 are journalled in the frame unit 58 to support the conveyor belt 55 with the substance to be chilled for conveyance thereon to the exterior of the refrigerated drum 17. The rollers 59 are journalled in notches 60 provided in the upstanding edges of the conveyor frame unit 58 that supports the conveyor belt 55. The conveyor belt 55 is actuated for linear displacement so as to feed the substance in the direction of the drum 17, thereby requiring the end pulleys 56 to rotate in a clockwise direction (viewed from Figure 1).

The frame unit 58 has upstanding sides 61 to confine the edible substance on the conveyor belt 55 as it is directed to the drum 17. The side members 61 are attached to upstanding brackets 62 fixed or anchored to the conveyor frame member 58. A pair of confronting blocks 63 are pivotally attached to rods 64 having coiled springs 65 in enveloping relation therewith. The rods 64 with their enveloping springs 65 are positioned in horizontal slots 66 provided in the side members 61 so as to yieldingly urge the confronting blocks 63 toward the periphery of the drum 17. The confronting blocks 63 have inclined converging surfaces that extend to the side members 61 so as to narrow the path of substance movement as the conveyor belt 55 approaches the drum 17.

The springs 65 urge the blocks 63 into engagement with the drum 17 and the converging surface thereof permits delivery of substances upon the surface of the drum 17 without any of the substance becoming dislodged from the path of travel. In order to transfer the substance from the conveyor belt 55 to the periphery of the refrigerated drum 17 in a uniform layer of any desired thickness, a transfer device or pan 67 is adjustably spaced from the surface of the drum 17 and adjacent the conveyor belt 55 so as to define the path of travel for the substances beyond the conveyor unit 58. To this end, the transfer device 67 has its top plate edge 68 in scraping engagement with the surface of the conveyor belt 55. The pan 67 extends rearwardly for a distance sufficient to insure that a uniform layer of the substance will adhere to the periphery of the drum by virtue of its refrigeration sufficient to give quick chilling adhesion of the substance thereto. This transfer member 67 has a cold or warm water intake pipe 69 and a discharge pipe 70 which provide a tempering fluid supply to the interior thereof, thereby maintaining the transfer plate 67 at a slightly higher temperature than the surrounding atmosphere, but at a temperature that is considerably above the refrigerated drum 17 to permit the substance to pass thereover without adhesion or friction so far as the transfer plate 67 is concerned.

The transfer plate 67 merely serves to apply the substance as it is discharged from the conveyor belt 55 to the surface of the drum 17 for adhesion thereto and displacement thereover without any appreciable frictional reaction. The transfer plate 67 is supported in a manner more fully described in my copending application Serial Number 100,505, filed September 12, 1936, which has matured into Patent No. 2,141,462. The position of the transfer plate 67 with respect to the periphery of the drum 17 predetermines the thickness of the substance layer adhering thereto, this being adjustable as explained in my copending application and which is movable forwardly or rearwardly with the conveyor unit 58 by means of the lever 71.

The lever 71 is pivoted for attachment to a shaft 71' having an offset eccentric 72 at each end thereof for attachment to the conveyor belt frame 58. An arcuate guide strap 73 is anchored to the conveyor frame so that the lever 71 is pivoted relative thereto and may be fastened thereon against movement from any adjusted position. The lever 71 will, thereupon, move the conveyor frame unit 58 forwardly or rearwardly so as to be positioned closer to or farther from the refrigerated drum 17 to determine the thickness of the substance layer as it traverses over the transfer plate 67.

Figure 4:
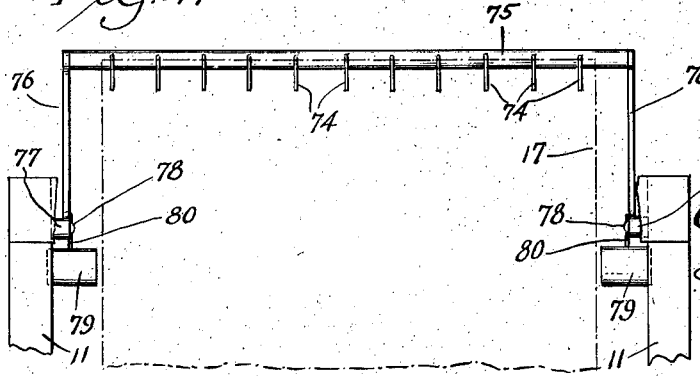
Figure 4 is a front detail view in elevation of a scoring device for a chilling roll viewed substantially from line IV—IV of Figure 1, the chilling roll being shown in dotted outline.

Suitable scoring wires 74 are anchored at predetermined spaced intervals along a rod 75 positioned from the periphery of the drum 17 and spaced thereabove (Figures 1 and 4). The scoring wires 74 are preferably of piano wire and normally arcuate in form so that their extremities will engage the surface of the drum 17 in a position in advance of the scraper mechanism which removes the chilled substances as will appear more fully hereinafter. As shown, the transverse rod 75 has a pair of depending arms 76 fixed to the extremities thereof to extend over and along the closed ends of the drum 17 (Figure 4). The depending arms 76 are formed integrally with horizontally extending arms 77 that are each pivoted at one extremity thereof to one of the vertical standards 11 as at 78. The other extremities of the horizontal arms 77 are provided with weights 79 and connected thereto by means of a wire or other connector 80 to normally gravitate the scoring wire anchoring rod 75 in a clockwise direction (viewed from Figure 1).

In consequence thereof, there will always be an urge on the extremities of the scoring wires 74 to effectively separate the chilled substances into strips before reaching the scraper mechanism 81. In order to remove the chilled substance as such rotates with the surface of the drum 17, a chambered scraper mechanism 81 is carried by arms 82 pivoted as at 83 to a plate 84 bridging the vertical standards 11 so that its sharp edge 85 will be in engagement with the periphery of the drum 17 to remove the chilled substances therefrom. Cold or warm water is continuously circulated through the interior of the scraper mechanism 81 by means of an intake pipe 86 connected therewith, the cold water being discharged through another pipe so as to slightly soften the chilled substances to facilitate its removal from the surface of the drum 17 and providing for its discharge into a conveyor unit 87 mounted by means of brackets 88 to the vertical standards 11.

The conveyor unit 87 has upstanding sides 89 along the width of the drum 17 to receive the chilled substances from the scraper mechanism 81. The position of the scraper edge 85 is adjusted by links 90 connected to the pivoted arms 82, the links 90 having pivotally connected control rods 91 extending through the plates 84 for threaded engagement by adjusting knobs 92. A spring 93 envelops each of the rods 91 to maintain the scraper 81 in adjusted position.

So that the temperature of the water circulating through the transfer pan 67 and scraper 81 may be varied, the supply of the tempering water is conducted through hot and cold water supply pipes 94 and 95, respectively. The water supply pipes 94 and 95 communicate with a mixing valve 96 provided to control the temperature of the water in the pipe lines 69 and 86 that preferably though not essentially have a temperature indicator 97 operatively connected therewith (Figure 1). The cold water pipe line 95 also extends for communication with the brine tank 44 to enable replenishing the supply of the brine cooling medium. When unusually cold well water is available and freezing temperatures are not required, the cold water may be supplied direct to the tank 44 in lieu of the brine solution and the direct expansion refrigeration system that is utilized to refrigerate the brine solution. To this end, a manual shut-off valve 99 is provided between the cold water pipe 95 and its extension 98 that leads to the interior of the tank 44, thereby providing for alternate controls and uses to which the various cooling mediums can most efficiently be put depending upon each installation. Manual shut-off valves 100—101 are interposed between the pipe line 94—95 on both sides of the mixing valve 96 and similar shut-off valves 102—103 are provided in the pipe line 69—86 on both sides of the temperature indicator 97 connected with a pipe which communicates with the mixing valve 96. With this arrangement, the tempering water may be regulated to the various instrumentalities to effect the temperature control thereof. Suitable return pipes are provided to enable the recirculation of the tempering water or the discharge thereof so that a continuing supply may be circulated from the hot and cold water supply pipes 94—95 depending upon the dictates of commercial practice.

It is to be noted that the discharge conveyor 87 may convey the chilled substances to any desired machine for packing, conversion or wrapping as conditions may require and the particular substance or product may need. Some of the edible substances that are effectively chilled by the instrumentalities described supra are butter, shelled eggs, lard, cottonseed oil, oleo margarine, liquids and plastic edibles that require conversion and preservation. It is worthy of note that should it be desired to soften products or effect their pasteurization, the coil 21 may be utilized for elevating the temperature of the drum 17 so as to pasteurize or otherwise treat the products or substances adhering thereto or applied thereagainst for movement therewith. Instead of having refrigerant pass through the coil 21, steam may be substituted therefor so as to elevate the temperature of the surface of the drum 17 to impart heating qualities to substances to effect their conversion from a plastic or solid to a liquid state depending upon the requirements of commercial practice and the substances to be treated.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a self-contained chilling device of the character described, the combination with means for feeding edible substances along a predetermined path, of a refrigerated surface in said path, means for transferring substances from said feeding means to said refrigerated surface for solidifying the edible substances disposed thereon, cooling medium conducting coils provided adjacent said surface to maintain the latter at refrigeration temperatures, means for imparting movement to said refrigerated surface, substance scoring means confronting said moving refrigerated surface, means for urging said scoring means toward said refrigerated surface, and means for removing the solidified substances from said refrigerated surface.

2. In a self-contained chilling device of the character described, the combination with means for feeding edible substances along a predetermined path, of a refrigerated surface in said path, means for transferring substances from said feeding means to said refrigerated surface for solidifying the edible substances disposed thereon, cooling medium conducting coils provided adjacent said surface to maintain the latter at refrigeration temperatures, means for imparting movement to said refrigerated surface, substance scoring means confronting said moving refrigerated surface, means for gravitating said scoring means toward said refrigerated surface, and means for removing the solidified substances from said refrigerated surface.

CHARLES DOERING.